United States Patent
Holtzman (10) Patent No.: US 7,209,712 B2
(45) Date of Patent: Apr. 24, 2007

(54) MEAN SQUARE ESTIMATION OF CHANNEL QUALITY MEASURE

(75) Inventor: Jack M. Holtzman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 446 days.

(21) Appl. No.: 10/254,329

(22) Filed: Sep. 23, 2002

(65) Prior Publication Data
US 2004/0057394 A1 Mar. 25, 2004

(51) Int. Cl.
*H04B 17/00* (2006.01)

(52) U.S. Cl. ................... 455/67.13; 375/346

(58) Field of Classification Search ........... 455/69, 455/522, 447, 501, 67.12, 67.13, 422, 103, 455/108, 114, 115.1, 115.3, 63.1, 114.2, 278.1, 455/517, 67.1, 67.11, 13; 370/337, 342, 370/311, 277; 375/267, 147, 347, 346
See application file for complete search history.

(56) References Cited

U.S. PATENT DOCUMENTS

| | | | | |
|---|---|---|---|---|
| 6,377,636 | B1 * | 4/2002 | Paulraj et al. | 375/346 |
| 6,449,462 | B1 * | 9/2002 | Gunnarsson et al. | 455/67.13 |
| 2002/0036994 | A1 * | 3/2002 | Huh et al. | 370/329 |
| 2002/0122407 | A1 * | 9/2002 | Molnar et al. | 370/347 |
| 2003/0031234 | A1 * | 2/2003 | Smee et al. | 375/147 |
| 2003/0054847 | A1 * | 3/2003 | Kim et al. | 455/517 |
| 2003/0223400 | A1 * | 12/2003 | Knisely et al. | 370/346 |
| 2004/0047438 | A1 * | 3/2004 | Zhuang et al. | 375/340 |
| 2004/0203790 | A1 * | 10/2004 | Ali et al. | 455/442 |

FOREIGN PATENT DOCUMENTS

WO 01/78220 A1 10/2001

OTHER PUBLICATIONS

Breiman, Leo, Ch. 7 Safety in Estimation, *STATISTICS With a View Toward Applications*, Boston, Houghton Mifflin Company, 1973, 250.
Proakis, John G., *Digital Communications*, 2d ed., New York, McGraw-Hill Book Company, 1989, 237-238.

* cited by examiner

*Primary Examiner*—Edward F. Urban
*Assistant Examiner*—Tu X Nguyen
(74) *Attorney, Agent, or Firm*—Philip R. Wadsworth; Thien T. Nguyen (57) ABSTRACT

Methods and apparatus for improving the feedback of channel information to a serving base station, which provides accuracy and reliability of such information. The process determines the received link quality indicators using historical information of the previously received indicators. The method may be applied to full link quality indicators, differential indicators, and/or a combination of both.

40 Claims, 8 Drawing Sheets

MEAN SQUARE ESTIMATION OF CHANNEL QUALITY MEASURE

BACKGROUND

1. Field

The present invention relates generally to communications, and more specifically, to analyzing the feedback of channel information, which may be used to improve the scheduling and rate control of traffic over a wireless communication system.

2. Background

In a wireless communication system, a receiver, such as a mobile station, may observe channel conditions of received transmissions, such as the carrier-to-interference (C/I) ratio, report such information to the transmitter, such as a serving base station. The base station then uses this knowledge to schedule transmissions to the remote station selectively.

In communication systems that use feedback mechanisms to determine the quality of the transmission media, channel conditions are continuously conveyed on the reverse link. Errors incurred by such transmission interfere with the efficient allocation of resources, quality of future transmissions, as well as impacting the performance of the system. Typically a complex algorithm and calculation is used at the transmitter (i.e., element receiving the quality feedback information) to determine the accuracy of the received quality feedback information. There is a need to verify the accuracy and reliability of the quality feedback information. There is further a need to reduce the complexity such verification.

DETAILED DESCRIPTION

The field of wireless communications has many applications including, e.g., cordless telephones, paging, wireless local loops, Personal Digital Assistants (PDAs), Internet telephony, and satellite communication systems. A particularly important application is cellular telephone systems for mobile subscribers. As used herein, the term "cellular" system encompasses both cellular and Personal Communication Services (PCS) frequencies. Various over-the-air interfaces have been developed for such cellular telephone systems including, e.g., Frequency Division Multiple Access (FDMA), Time Division Multiple Access (TDMA), and Code Division Multiple Access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ *Generation Partnership Project* "3GPP", Document Nos. 3G TS 25.211, 3G TS 25.212, 3G TS 25.213, and 3G TS 25.214.

The telecommunication standards cited above are examples of only some of the various communication systems that can be implemented. Some of these various communication systems are configured so that remote stations are able to transmit information regarding the quality of the transmission medium to a serving base station. This channel information may then be used by the serving base station to optimize the power levels, the transmission formats, and the timing of forward link transmissions, and further, to control the power levels of reverse link transmissions.

As used herein, "forward link" refers to the transmissions directed from a base station to a remote station and "reverse link" refers to transmissions directed from a remote station to a base station. The fast fading on the forward link and the reverse link are uncorrelated, meaning that observations of one do not necessarily provide information about the other.

Channel conditions of received forward link transmissions, such as the Carrier-to-Interference ratio (C/I), can be observed by a remote station, which reports such information to a serving base station. The base station then uses this knowledge to schedule transmissions to the remote station selectively. For example, if the remote station reports the presence of a deep fade, the base station would refrain from scheduling a transmission until the fading condition passes. Alternatively, the base station may decide to schedule a transmission, but at a high transmission power level in order to compensate for the fading condition. Alternatively, the base station may decide to alter the data rate at which transmissions are sent, by transmitting data in formats that can carry more information bits. For example, if the channel conditions are bad, data can be transmitted in a transmission format with redundancies so that corrupted symbols are more likely to be recoverable. Hence, the data throughput is lower than if a transmission format without redundancies were used instead.

The base station can also use this channel information to balance the power levels of all the remote stations within operating range, so that reverse link transmissions arrive at the same power level. In CDMA-based systems, channelization between remote stations is produced by the use of pseudorandom codes, which allows a system to overlay multiple signals on the same frequency. Hence, reverse link power control is an essential operation of CDMA-based systems because excess transmission power emitted from one remote station could "drown out" transmissions of its neighbors.

In communication systems that use feedback mechanisms to determine the quality of the transmission media, channel conditions are continuously conveyed on the reverse link. This produces a large load upon the system, consuming system resources that could otherwise be allocated to other functions.

Figure 1:
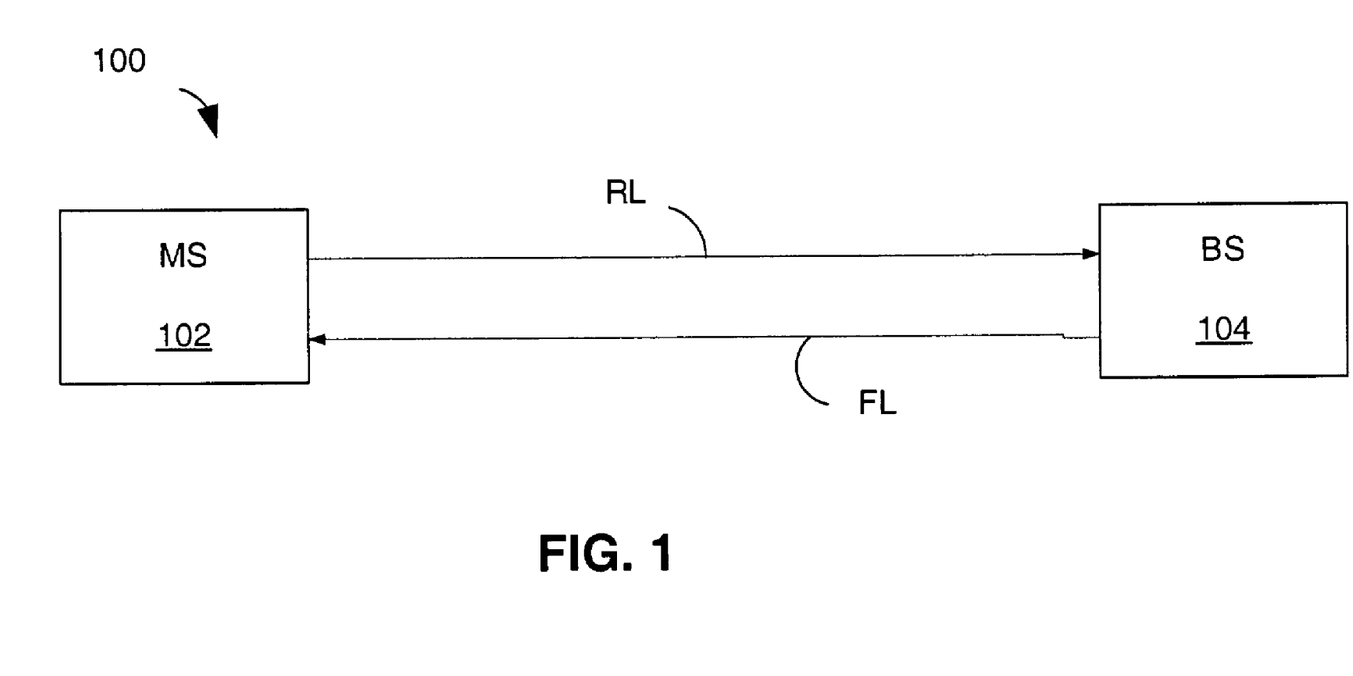
FIG. 1 is a diagram illustrating forward link and reverse link in a communication system.

As illustrated in FIG. 1, transmission links in a wireless communication network 100 are defined with respect to direction of propagation between a Base Station (BS) 104 and a Mobile Station (MS) 102. Communications from the BS 104 to the MS 102 are transmitted via the Forward Link (FL). The forward link is controlled by the BS 104, which determines the transmission power and data rate for data transmissions. Communications from the MS 102 to the BS 104 are transmitted via the Reverse Link (RL). The MS 102 measures the quality of the FL and sends an indication of the measured quality to the BS 104 via the RL. The MS 102 may measure the C/I or other Signal-to-Noise Ratio (SNR) of the received signals. The MS 102 may quantize the measurements and transmit the quantized values. The BS 104 then uses the quality information to implement control of the FL.

Figure 2:
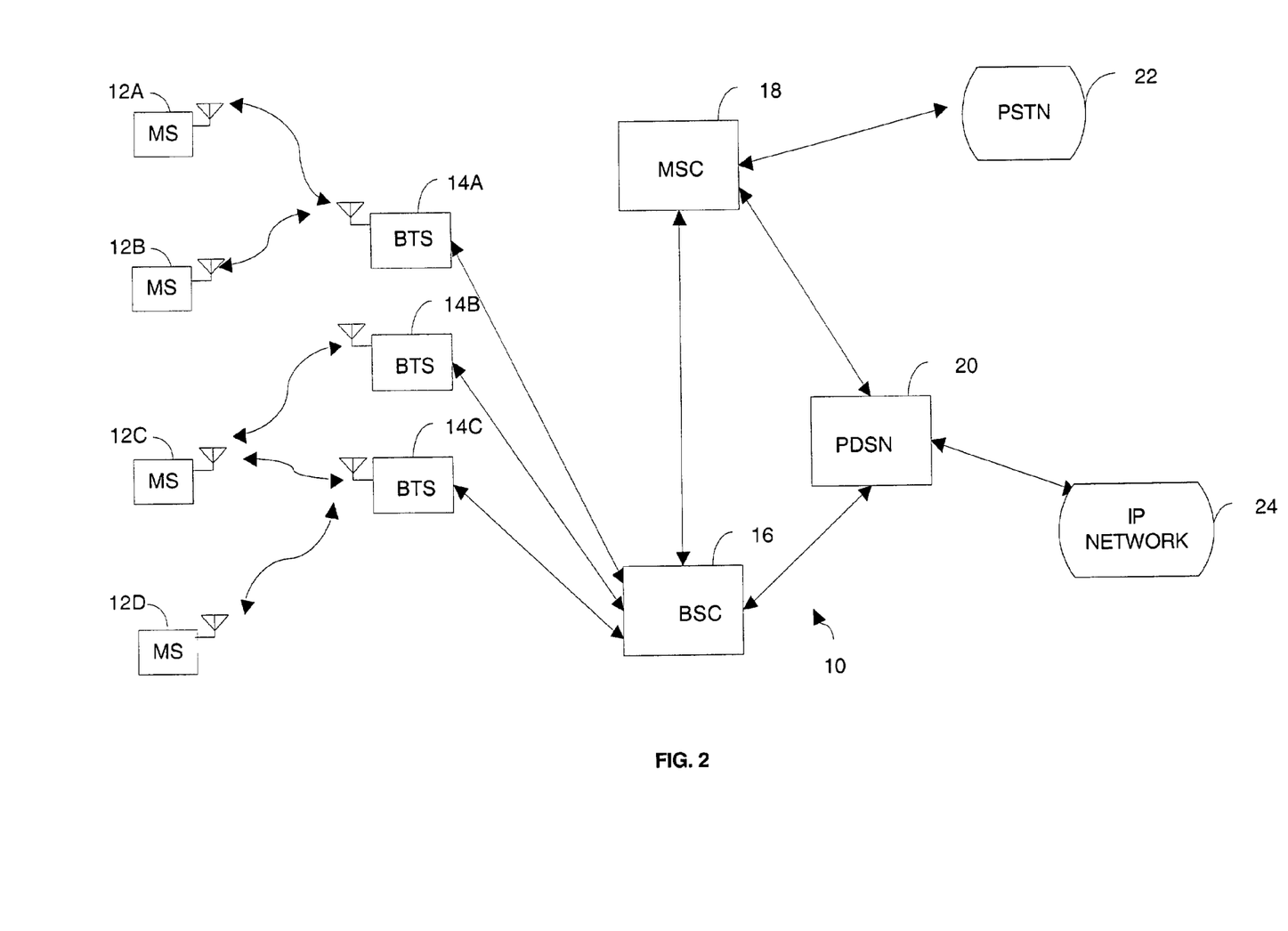
FIG. 2 is a diagram of a wireless communication network.

The network or system 100 may include a plurality of MSs (also referred to as remote stations, subscriber units or user equipment), a plurality of BSs (also referred to as Base Station Transceivers (BTSs) or Node B in a data communication system such as the High Data Rate (HDR) system as described by 3GPP2, a Base Station Controller (BSC) (also referred to as a radio network controller or packet control function), a Mobile Switching Center (MSC), a packet data serving node (PDSN) or internetworking function (IWF), a Public Switched Telephone Network (PSTN) (typically a telephone company), and/or an Internet Protocol (IP) network (typically the Internet). FIG. 2 illustrates a system including the various components. For purposes of simplicity, four mobile stations 12a–12d, three base stations 14a–14c, one BSC 16, one MSC 18, and one PDSN 20 are shown. It would be understood by those skilled in the art that there could be more or less number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 can be coupled directly to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 2, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used hereafter. Such use is not intended to limit the implementation of the embodiments herein to cdma2000 systems. Implementations in other systems, such as, e.g., WCDMA, can be accomplished without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and/or code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration.

A scheduling element in the base station is configured to control the transmission format of each packet, the rate of each packet, and the slot times over which each packet is to be transmitted to a remote station. The terminology "packet" is used to describe system traffic. Packets can be divided into subpackets, which occupy slots of a transmission channel. "Slot" is used to describe a time duration of a message frame. The use of such terminology is common in cdma2000 systems, but the use of such terminology is not meant to limit the implementation of the embodiments herein to cdma2000 systems. Implementation in other systems, such as, e.g. Wideband-CDMA (W-CDMA), may be accomplished without affecting the scope of the embodiments described herein.

Scheduling is a vital component in attaining high data throughput in a packet-based system. In the cdma2000 system, the scheduling element (which is also referred to as a "scheduler" herein) controls the packing of payload into redundant and repetitious subpackets that can be soft-combined at a receiver, so that if a received subpacket is corrupted, it can be combined with another corrupted subpacket to determine the data payload within an acceptable Frame Error Rate (FER). For example, if a remote station requests the transmission of data at 76.8 kbps, but the base station knows that this transmission rate is not possible at the requested time due to the condition of channel, the scheduler in the base station can control the packaging of the data payload into multiple subpackets. The remote station will receive multiple corrupted subpackets, but will still be likely to recover the data payload by soft-combining the uncorrupted bits of the subpackets. Hence, the actual transmission rate of the bits can be different from the data throughput rate.

The scheduling element in the base station uses an open-loop algorithm to adjust the data rate and scheduling of forward link transmissions. The open-loop algorithm adjusts transmissions in accordance with the varying channel conditions typically found in a wireless environment. In general, a remote station measures the quality of the forward link channel and transmits such information to the base station. The base station uses the received channel conditions to predict the most efficient transmission format, rate, power level and timing of the next packet transmission. In the cdma2000 1xEV-DV system, the remote stations can use a Channel Quality Indicator Feedback Channel (CQICH) to convey channel quality measurements of the best serving sector to the base station. The channel quality may be measured in terms of a carrier-in-interference (C/I) ratio and is based upon received forward link signals. The C/I value is mapped onto a five-bit Channel Quality Indicator (CQI) symbol, wherein the fifth bit is reserved. Hence, the C/I value can have one of sixteen quantization values.

Since the remote station is not prescient, the remote station transmits the C/I values continuously, so that the base station is aware of the channel conditions if ever any packets need to be transmitted on the forward link to that remote station. The continuous transmission of 4-bit C/I values consumes the battery life of the remote station by occupying hardware and software resources in the remote station.

In addition to the problems of battery life and reverse link loading, there is also a problem of latency. Due to propagation and processing delays, the base station is scheduling transmissions using outdated information. If the typical propagation delay is 2.5 ms in duration, which corresponds to a 2-slot delay in systems with 1.25 ms slots, then the base station may be reacting to a situation that no longer exists, or may fail to react in a timely manner to a new situation.

For the above reasons, the communication network requires a mechanism to convey information to the base station that allows the base station to quickly reschedule transmissions due to sudden changes in the channel environment. In addition, the aforementioned mechanism should reduce the drain on battery life of the remote station and the load on the reverse link.

In one embodiment, full C/I values are transmitted on a re-synch subchannel while incremental 1-bit values are transmitted over a differential feedback subchannel. The incremental 1-bit values of 1 and 0 are mapped to +0.5 dB and −0.5 dB, but can be mapped to other values ±K as well, where K is a system defined step size.

The values sent on the re-synch and differential feedback subchannels are determined based on the forward link C/I measurements. The value sent on the re-sync subchannel is obtained by quantizing the most recent C/I measurement. A one-bit value is sent on the differential feedback subchannel and is obtained by comparing the most recent C/I measurement with the contents of an internal register. The internal register is updated based on past values sent on the re-synch and differential feedback subchannels, and represents the remote station's best estimate of the C/I value that the base station will decode.

In a first mode, channel elements can be placed within a remote station to generate the re-synch subchannel and the differential feedback subchannel over the CQI channel (CQICH), wherein the re-synch subchannel occupies one slot of an N-slot CQICH frame and the differential feedback subchannel occupies all slots of the N-slot CQICH frame, so that an incremental 1-bit value is transmitted in each slot.

In one embodiment, the re-synch subchannel and the differential feedback subchannel are not sent in parallel.

Figure 3A:
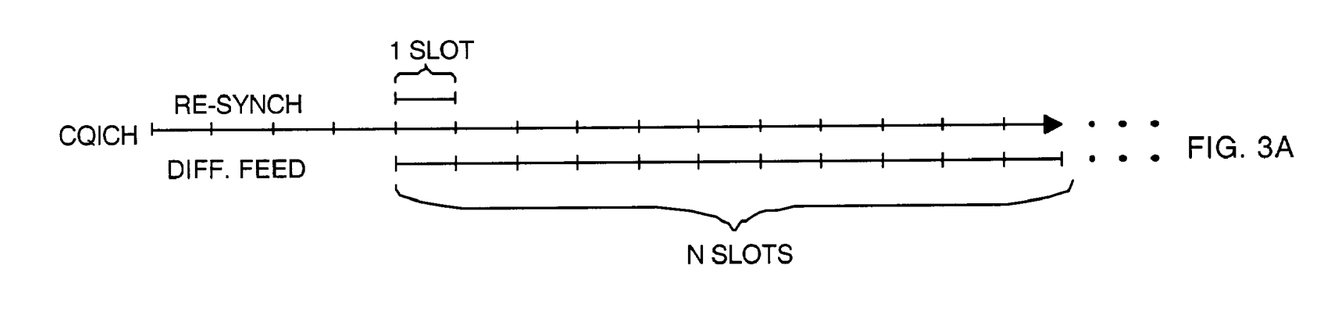
FIG. 3A, FIG. 3B, and FIG. 3C are timelines that describe the interactions between the re-synch subchannel and the differential feedback subchannel.

Instead, the re-synch subchannel is transmitted over one slot and the system refrains from transmitting the differential feedback subchannel in that particular slot. In another embodiment, in at least one slot of the N-slot CQICH frame, both a full C/I value and an incremental 1-bit value are transmitted to the base station. This concurrent transmission is possible through the use of orthogonal or quasi-orthogonal spreading codes, or in an alternative embodiment, by time interleaving the two subchannels in some predetermined fashion. FIG. 3A is a timeline illustrating the transmission timing of the re-synch channel and the differential feedback subchannel operating in parallel in the later embodiment.

The channel elements may be configured so that the two subchannels are generated with the re-synch subchannel operating at a reduced rate. The re-synch channel operates at a reduced rate when a full C/I value is spread over at least two slots of an N-slot CQICH frame. For example, the full C/I value may be transmitted at a reduced rate over 2, 4, 8, or 16 slots of a 16-slot CQICH frame. The differential feedback subchannel occupies all of the slots of the N-slot CQICH frame. Hence, an incremental 1-bit value is transmitted in each slot, in parallel to the re-synch subchannel. The remote station should transmit the full C/I value at the reduced rate when the reverse link is suffering from unfavorable channel conditions. In one embodiment, the base station determines the reverse link channel conditions and transmits a control signal to the remote station, wherein the control signal informs the remote station as to whether the re-synch subchannel should operate at a reduced rate or not. Alternatively, the remote station can be programmed to make this determination independently.

Figure 3B:
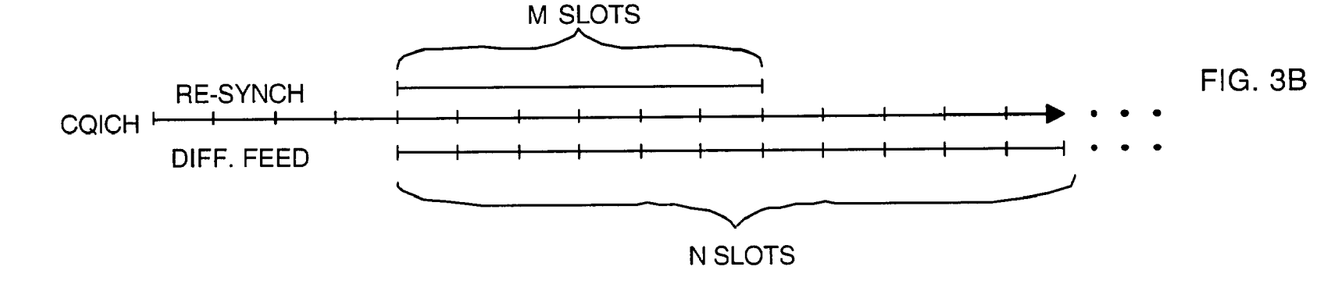
Figure 3C:
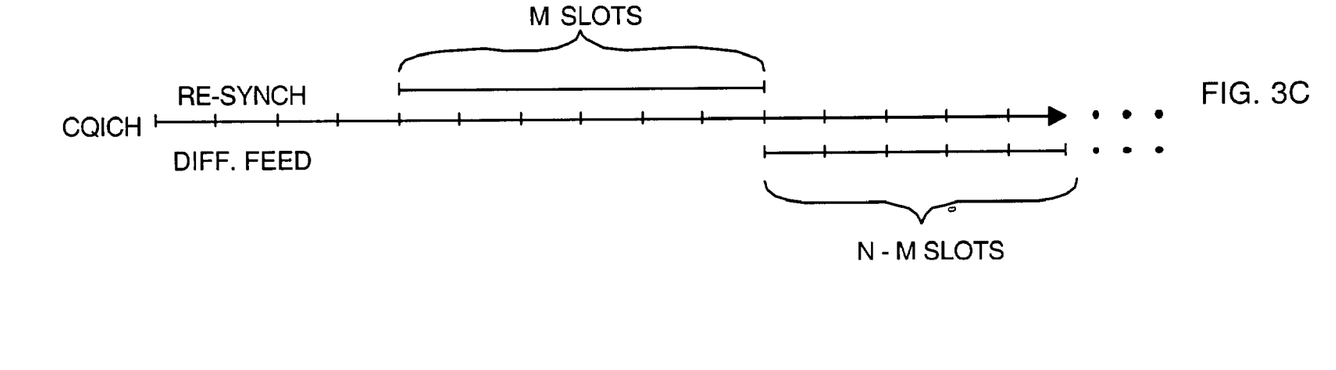

In one implementation, the two subchannels work in parallel at a reduced rate wherein a full C/I value is spread over all slots of a N-slot CQICH frame and each slot also carries an incremental 1-bit value. In an alternate embodiment, the differential feedback subchannel occupies all of the slots of the N-slot frame except for the first slot. In yet another alternate embodiment, the differential feedback subchannel and the re-synch subchannel are not sent in parallel at all; the re-synch subchannel operates first over M slots, and the differential feedback subchannel operates over the next N-M slots of the N-slot frame. FIG. 3B and FIG. 3C are timelines illustrating the transmission timing of the re-synch subchannel and the differential feedback subchannel. The internal register of the remote station may be updated in the first, second or $M^{th}$ slot, depending on which operating mode is in use.

In another embodiment, the full C/I value can also be sent at unscheduled slots, whenever the remote station determines that the C/I estimate kept at the base station is out of synchronization. The base station continuously monitors the CQICH to determine whether an unscheduled full C/I value symbol is present or not.

In yet another embodiment, the full C/I value is only sent when the remote station determines that the C/I estimate kept at the base station is out of synchronization. In this embodiment, the full C/I value is not sent at regularly scheduled intervals.

A scheduling element in a base station can be configured to interpret channel information received on the re-synch subchannel and the differential feedback subchannel, wherein the channel information from each subchannel is used to make transmission decisions that account for the state of the channel. The scheduling element can comprise a processing element coupled to a memory element, and is communicatively coupled to the receiving subsystem and the transmission subsystem of the base station.

Figure 4:
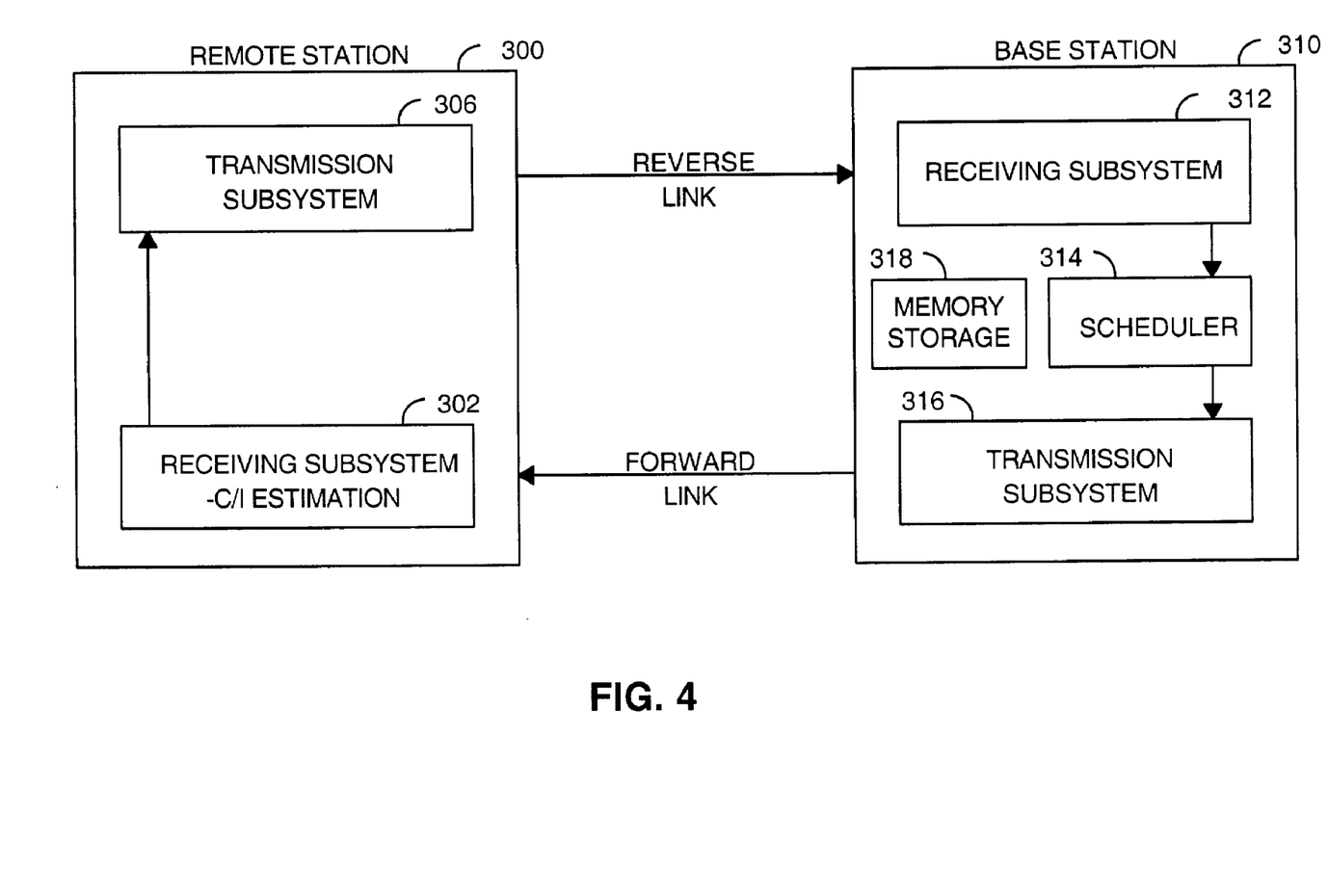
FIG. 4 is a block diagram of a remote station in communication with a base station.

FIG. 4 is a block diagram of some of the functional components of a base station with a scheduling element. A remote station 300 transmits on the reverse link to a base station 310. At a receiving subsystem 312, the received transmissions are de-spread, demodulated and decoded. A scheduler 314 receives a decoded C/I value and orchestrates the appropriate transmission formats, power levels, and data rates of transmissions from the transmission subsystem 316 on the forward link. The base station 310 also includes a memory storage device 318 for storing link quality indicator information.

At the remote station 300, a receiving subsystem 302 receives the forward link transmission and determines the forward link channel characteristics. A transmission subsystem 306 transmits such forward link channel characteristics to the base station 310.

In the embodiments described herein, the scheduling element 314 may be programmed to interpret the channel information received on the re-synch subchannel together with the channel information received on the differential feedback subchannel, or to interpret the channel information received on the re-synch subchannel separately from the channel information received on the differential feedback subchannel. The scheduling element can also be configured to perform a method to alternate which subchannel will be used to update channel information.

When the remote station transmits the channel information, a serving base station will receive the full C/I value (or other link quality indicator) over one slot and incremental values over all slots of the frame. In one embodiment, the scheduler can be programmed to reset internal registers that store the current state of the channel, wherein the registers are reset with the full C/I value received over one slot of the re-synch subchannel. The incremental values received over the different feedback subchannel are then added upon receipt to the full C/I value stored in the register. In one aspect, the incremental value that is transmitted concurrently over the slot with the full C/I value is intentionally discarded, since the full C/I value already accounts for this incremental value.

A serving base station may receive the full C/I value over multiple slots and incremental values over all slots of the frame. In one embodiment, the serving base station estimates the channel conditions at the time that is scheduled for a packet transmission by accumulating the incremental values received on the differential feedback subchannel from the second slot to the $M^{th}$ slot, where M is the number of slots over which the full C/I value is spread out. This accumulated value is then added to the full C/I value, which was received on the re-synch subchannel over the M slots. In another embodiment, this "accumulate and add" method can be performed concurrently with an independent action for "up-down" bits, which updates the C/I value stored in the register as directed by the incremental values. Hence, the register storing the current channel condition information is updated each time an incremental value is received, and the register is then updated with the accumulated value added to the full C/I value.

Figure 5:
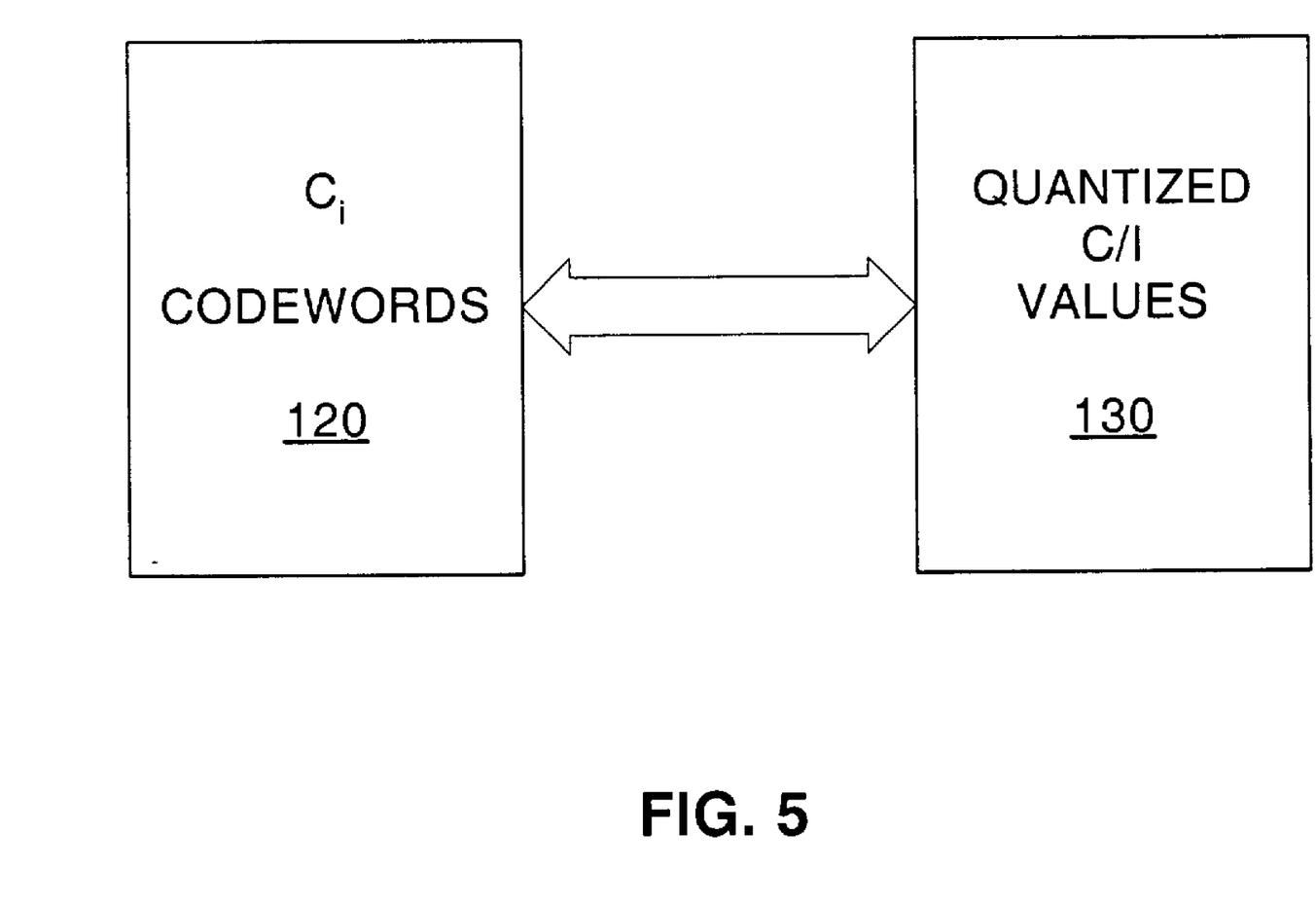
FIG. 5 is a mapping of the codewords to link quality measurements.

FIG. 5 illustrates a mapping of coded values, i.e., quantized values of C/I, to the measured values of C/I. A first memory storage device 120 stores the quantized values or code values. A second memory storage device 130 stores the measured value ranges associated with each of the codes. According to one embodiment, the mapping as illustrated in FIG. 5 is implemented in software or hardware that performs a calculation to transform the measured value into the code value.

Figure 6:
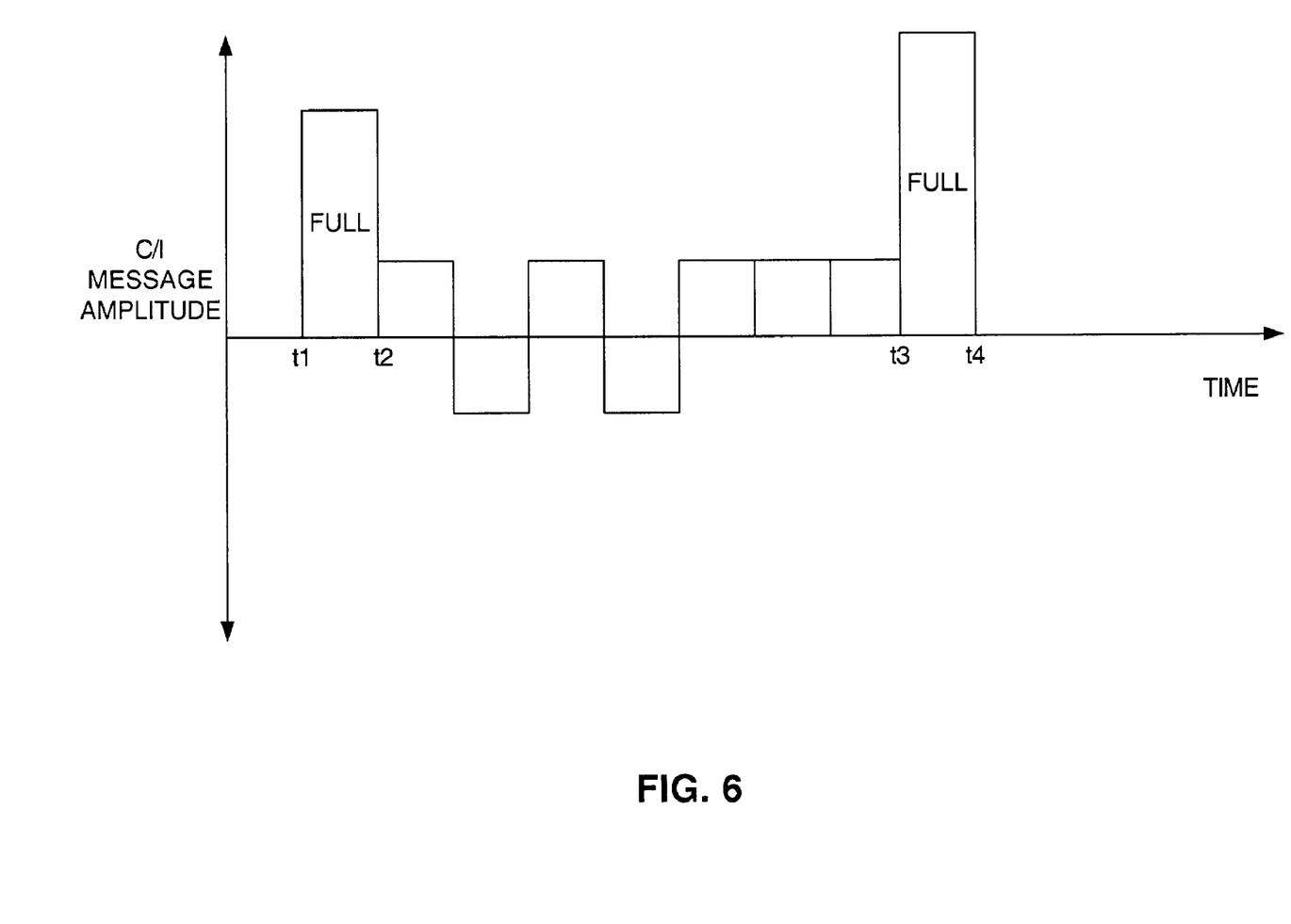
FIG. 6 is a timing diagram of transmission of full link quality codewords associated with link quality measurements, and differential indicators.

FIG. 6 is a timing diagram of transmission of the quality measurements, both full measurement indication and differential values. As illustrated, the full measurement indication is so labeled. Full measurement indications are transmitted between time t1 and t2, and between time t3 and t4. For each slot between the full measurement indications, a differential value is transmitted. The full quality measurement indicators or C/I values of one embodiment are 4 bits, coded. The full quality measurement indicators are followed by 15 up/down commands, i.e., differential values. The total slot cycle is 16 slots. Each slot cycle the full C/I is refreshed at least once.

One embodiment provides a method of evaluating link quality feedback information which may be applied to the margin applied by the scheduler. According to such embodiment, the full link quality indicator is received at the BS. The BS then calculates the probability of receiving the received code word corresponding to a C/I measurement made at the MS. The BS determines the estimate having a minimum mean square error using a condition mean calculation. The minimum mean square error identifies the "best" estimated code word, and thus the best estimated link quality measurement. By determining the minimum Mean Square Error (MSE) estimate of the link quality measure, an estimate of the Root Mean Square (RMS) error is calculated. The estimates are then sent to a scheduler, which may incorporate the error estimate into an operational margin. The use of the minimum MSE allows tagging of unexpected C/I values. To this end, the method uses past full C/I differences to tag highly unexpected new full C/I values. The minimum MSE approach may also be applied to the differential (i.e., up/down) indicators.

To determine the quality feedback indicator for the full measurement indicator, which in the present embodiment is a C/I measurement, let $$\{C_i\} = \text{set of codewords associated with permissible full C/I values} \quad (1)$$

and let $$R = \text{received full C/I codeword.} \quad (2)$$

The method determines an estimate of the C/I received using a minimum Mean Square Error (MSE) calculation. The MSE estimator incorporated is a conditional mean calculation. The estimator is described as $$E((C/I) | R) = \sum_{i=1}^{n} C_i P(C_i | R) = \sum_{i=1}^{n} C_i \frac{P(R | C_i) P(C_i)}{\sum_{i=1}^{n} P(R | C_j) P(C_j)}. \quad (3)$$

Note that in Equ. (3), Ci represents the C/I measurement associated with the codeword Ci. There are n C/I codewords. In other words, the C/I measurements are quantized and mapped to a total number of n codewords. The estimator of Equ. (3) may be considered to be an expected value operator E(), determining the expected value of the measured C/I given the received value of the codeword.

The estimator described by Equ. (3) evaluates $P(C_i)$ from past full values of C/I measurements. The estimator maintains a running mean and standard deviation of the differences between the full C/I measurements and estimates a probability distribution of likely values, i.e., $P(C_i)$. For each received full link quality indicator, a conditional probability is calculated for each possible codeword given the received value. The codeword having a minimum mean square error so calculated is considered the "best estimate." One method of determining the minimum mean square error is given as in Equ. (3), however, alternate embodiments may employ alternate methods of calculation.

In the presently described embodiment, the link quality indicator is a full link quality indicator, however, alternate embodiments (including those described hereinbelow) may incorporate alternate link quality indicators, such as differential indicators. Alternate methods of determining the probability that a received link quality indicator corresponds to that originally transmitted may be employed. Still further, it may be possible to compare such probabilities over a subset of the available codewords given historical and/or current operating conditions, link quality indicators, and other parameters of the system. For example, during operation, when only a subset of available codewords is received over a predetermined time period, one embodiment may only compare those codewords in the subset.

In evaluating $P(C_i)$, methods to increase outlier resistance may be employed. Outlier resistance refers to the robustness of the system with respect to data abnormally different from realistic data. Outlier data can corrupt parameter estimation. An example that is considered resistant to outlier data is given as:

estimate of the standard deviation of $$(C\hat{/}I) = \sqrt{\frac{\pi}{2}}.$$

estimated of average absolute difference (4)

The next step is to estimate the RMS error, which is given as the square root of:

$$E\big((C/I) - (C\hat{/}I) \, | \, R\big)^2 \approx \sum_{i=1}^{n} (C_i - E((C/I) | R))^2 P(C_i | R). \quad (5)$$

Figure 7:
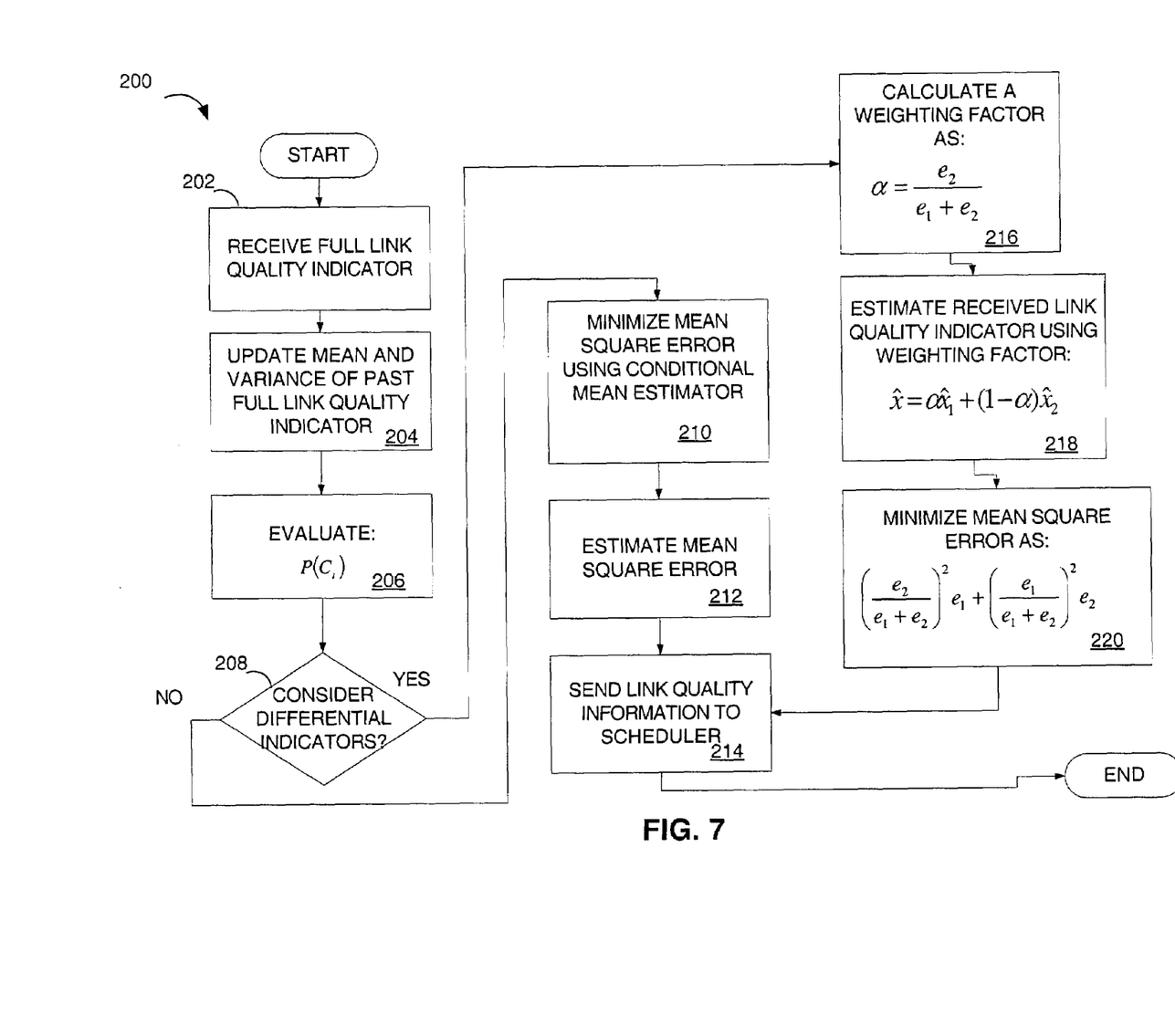
FIG. 7 is a flow diagram of a method for evaluating link quality indicators.

FIG. 7 illustrates the previously described embodiment when a full link quality indicator is received at a Base Station (BS). The method 200 of FIG. 7 includes two modes of operation: 1) a first mode wherein the full link quality indicators are analyzed without consideration of any intervening differential indicators; and 2) a second mode, which considers the intervening differential indicators. While a BS is used for the present discussion, the present embodiments are applicable to any wireless communication apparatus that is receiving a link quality indicator and basing transmission decisions thereon.

According to the method 200, the BS receives a full link quality indicator at step 202. Processing continues to step 204 to update the variance and mean of the currently received data. Variance and mean information is stored in memory at the BS. The result of step 204 updates the most recent mean and variance information. One embodiment keeps historical information as well and provides such information to the scheduler. At step 206, the process evaluates the probability $P(C_j)$, evaluated for j=1, 2, ..., n, wherein n is the total number of codewords associated with the link quality measurements, i.e., set of available codewords. The probability $P(C_j)$ is a probability that the codeword j was received.

The BS then determines at decision diamond 208 whether to consider differential indicators in analyzing the received full link quality indicator, e.g., first mode or second mode as described above. In other words, will the present estimates be based solely on the recent received full link quality indicator or will the estimator consider the differential indicators received prior to receiving the full link quality indicator at step 202. An alternate embodiment may evaluate $P(C_j)$ over a subset of the set of available codewords. At step 210 the process determines the mean square error for each of the codewords evaluated in step 208, and determines the codeword having a minimum mean square error. Step 208 applies Equ. (3) given above. The process then estimates the mean square error at step 212. The BS then provides the link quality information to the scheduler at step 214. Provision of such information, and particularly with respect to reliability and confidence information regarding the estimated received signals, is used to schedule data transmissions in a system supporting data transmission.

Continuing with FIG. 7, when the estimations and calculations include the previously received differential indicators, processing continues to step 216 to calculate a weighting function for application in determining a mean square error of the differential indicator. As the differential indicator is a binary indicator, there are two possibilities: positive or negative. The differential indicator is identified as b. The received differential indicator is given as x, wherein x is assumed to include a received energy E associated with the differential indicator and to include noise N. The energy of each possibility (i.e., positive and negative) is evaluated to determine the minimum mean square error of each estimate. For example, at a given time, the received signal x is evaluated for both the case of a positive differential indicator and a negative differential indicator.

The BS may combine the newly received full link quality indicator with the last previously received full link quality estimate updated by intervening differential indicators. Considering the embodiment wherein the full indicator is transmitted over one slot and the system refrains from transmitting the differential indicator in that particular slot, although this information is one slot out of date, the BS may minimize the square error $E[\hat{x}-x]^2$ using two (independent) estimates, given as:

$$\hat{x} = \alpha \hat{x}_1 + (1-\alpha)\hat{x}_2, \quad (6)$$

wherein a weighting factor is given as:

$$\alpha = \frac{e_2}{e_1 + e_2}, \text{ and} \quad (7)$$

wherein $e_i$ is the mean square error of estimate i. This yields the minimum mean square error as $$\min mse = \left(\frac{e_2}{e_1 + e_2}\right)^2 e_1 + \left(\frac{e_1}{e_1 + e_2}\right)^2 e_2 \quad (8)$$

Note that the above description applies as well to an embodiment wherein the system transmits the differential indicator when it also transmits the full indicator. In this case, the information is not out of date.

Note that $\hat{x}_1$ may represent a first link quality estimate using only the most recently received full link quality indicator, while $\hat{x}_2$ may represent a second link quality estimate calculated without using the most recently received full link quality indicator, but rather using the previous full link quality indicator and applying any subsequent intervening differential indicators received. The first and second estimates each have a corresponding mean square error and Equs. (6) and (7) weight each accordingly.

Returning to FIG. 7 and the second mode of operation wherein analysis of the received full link quality indicator considers intervening differential indicators, at step 216 the weighting factor $\alpha$ of Equ. (7) is calculated as given above. Alternate embodiments may employ alternate methods of weighting the various terms included in the estimate of the received sample $\hat{x}$. Note that if one of the mean square error of one estimate is much smaller than the other, the estimate with the smaller mean square error is considered the better estimate. If $e_1$ is the smaller mean square error, then the $e_1$ term in the denominator will increase $\alpha$, and thus emphasize the $e_1$ term in Equ. (6). If $e_2$ is the smaller mean square error, then the $e_2$ terms in the denominator and numerator will reduce $\alpha$, and thus emphasize the $e_2$ term in Equ. (6). In this way, the terms of Equ. (6) are weighted to favor the estimate having the least mean square error, which is considered the "best" or better estimate. Note also that if the mean square error of estimate 1 (i.e., $e_1$) is approximately equal to the mean square error of estimate 2 (i.e., $e_2$), then $$\alpha \cong \frac{1}{2}$$

and each of the terms on the right hand side of Equ. (6) are weighted equally.

Returning to FIG. 7, the estimate of the received signal is generated at step 218 applying the weighting factor of Equ. (7) to the calculation of Equ. (6) as given above. Processing then continues to step 220 to minimize the mean square error of the estimate calculated in step 218. Step 220 uses Equ. (8) given hereinabove. Processing then continues to step 214 to send the link quality information to the scheduler.

As described, the processing of the second mode, as illustrated in steps 216 to 220 of FIG. 7, prepares an estimate of the received sample $\hat{x}$, using two estimates: the first estimate, $\hat{x}_1$, represents the link quality indicator estimate using only the most recently received full link quality indicator; while the second estimate, $\hat{x}_2$, represents the estimate of the previously received link quality indicator with differential indicators applied thereto. Each estimate has a respective mean square error. Equs. (6) and (7) apply weights to each estimate according to the relation of the mean square errors. Note that in an alternate embodiment, when receiving a new full C/I, the transceiver may decide to ignore the past up/down decisions and return to the last received full link quality measurement.

The procedure used to estimate the differential indicators, i.e., up/down signals, is described in the following equations. Let x represent the received sample, E represent the received signal energy of the sample, b represent the differential value transmitted, and N represent the noise added during transmission. Equ. (9) identifies the received signal as containing signal energy associated with the transmitted link quality indicator (differential indicator) and noise.

$$x = \sqrt{E}b + N, \text{ and} \quad (9)$$

$$b = \pm 1, \quad (10)$$

To minimize the mean square error, estimate b using:

$$\hat{b} = \tanh\left(\frac{x\sqrt{E}}{N}\right). \quad (11)$$

The hyperbolic tangent is used so as to provide some guidance when the energy of the received differential indicator is low. When the energy is of the received differential indicator is high, the differential indicator transmitted is estimated with relative certainty. If, however, the received differential indicator has low energy, there is uncertainty.

The sequence of differential indicators is provided as a sequence between the full link quality indicators. At step n of the sequence of differential indicators, wherein each differential indicator represents Δ dB, the dB value is given as $$(C/I)(n) = (C/I)_{last\ full} + \Delta \sum_{i=1}^{n} a_i x_i \quad (12)$$

which may be written as:

$$(C/I)(n)_{linear} = (C/I)_{last\ full,linear} \prod_{i=1}^{n} 10^{\Delta a_i x_i / 10} \quad (13)$$

Equs. (12) and (13) mathematically describe the operation of accumulating the differential indicators (i.e., up/dn instructions). Equ. (12) provides such calculation in terms of dB, while Equ. (13) provides such calculation in terms of linear variables. The product is a lognormal random variable (r.v.) conditioned on the last full C/I. For the lognormal distribution, the associated normal r.v. is given as $$\Delta \sum_{i=1}^{n} a_i x_i. \quad (14)$$

The mean and variance of $(C/I)(n)_{linear}$ may then be derived using the variance, which is calculated as:

$$\sigma^2 = \Delta^2 \sum_{i=1}^{n} mean\ sq.error(\hat{b}_i), \quad (15)$$

An alternate embodiment uses an estimate of the last full link quality indicator incorporating information from previous differential indicators. Such an estimate replaces Equs. (10) and (11).

Figure 8:
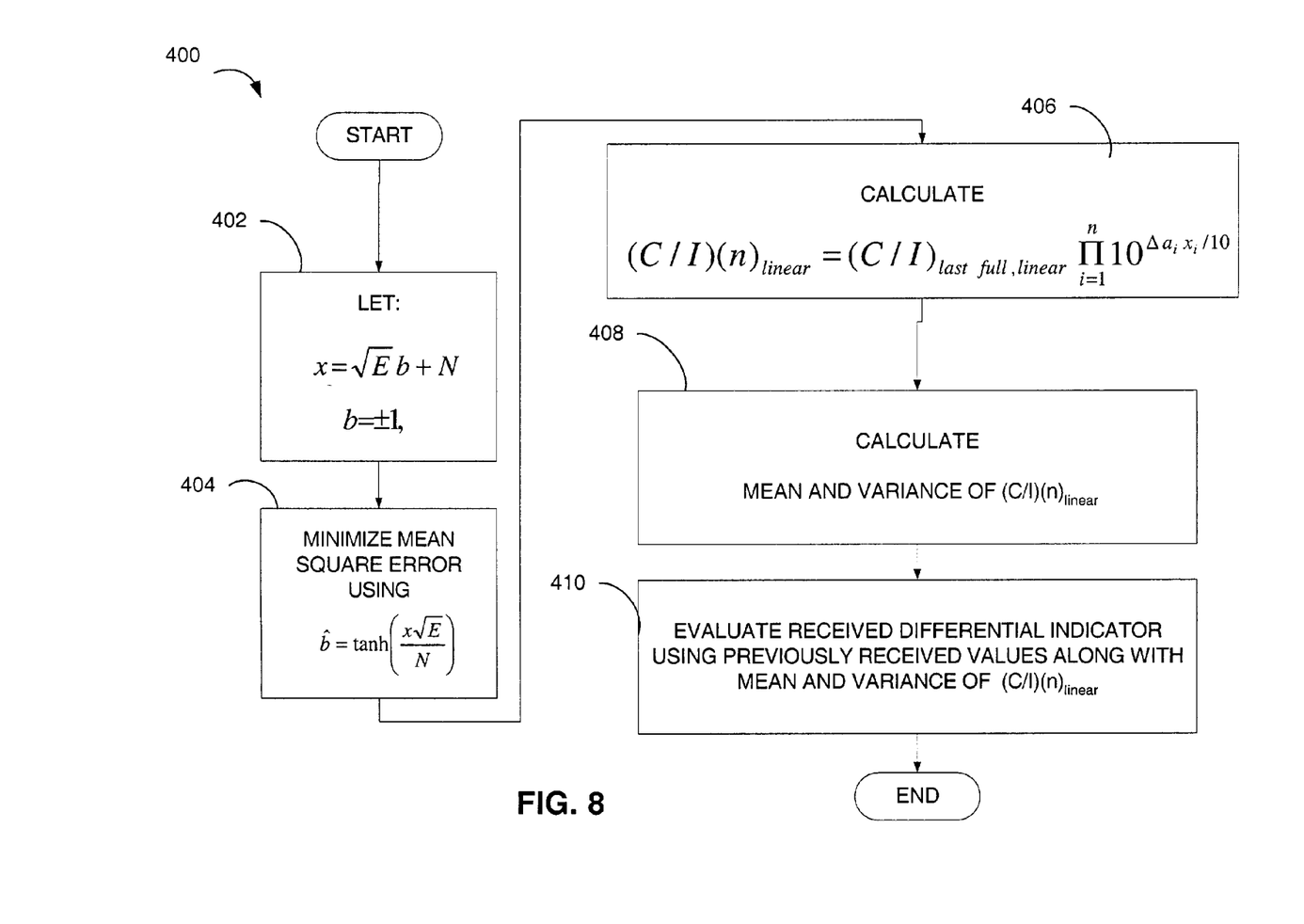
FIG. 8 is a flow diagram of a method for evaluating differential indicators.

FIG. 8 illustrates a method of evaluating the received differential indicators, wherein prior received values are used to determine the accuracy of each received differential indicator. The process 400 begins with the definitions of Equs. (7) and (8). The mean square error is minimized at step 404 as in Equ. (9). Step 406 applies a calculation as in Equ. (11). At step 408 the process calculates a mean and variance of $(C/I)(n)l_{linear}$. Step 410 evaluates the received differential indicator using previously received values along with the mean and variance of $(C/I)(n)l_{linear}$.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a wireless communication system, comprising:
receiving a link quality indicator, the link quality indicator one of a plurality of link quality indicator values;
determining a conditional probability for each of the plurality of link quality indicator values, wherein the link quality indicator is a full link quality indicator, and wherein the link quality indicator is a measure of the Carrier to Interference ratio (C/I);
evaluating $$\sum_{i=1}^{n} Ci \frac{P(R \mid Ci)P(Ci)}{\sum_{j=1}^{n} P(R \mid Cj)P(Cj)},$$

wherein n is the total number of link quality values, $C_i$ represents each link quality indicator, R represents the received link quality indicator, P(|) is a conditional probability operator, and i and j are indices;
selecting one of the plurality of link quality indicators values based on the conditional probabilities, wherein selecting one of the plurality of link quality indicator values considers the minimum mean square error.

2. The method as in claim 1, further comprising:
scheduling link transmissions using the estimate of the minimum mean square estimate.

3. A method in a wireless communication system, comprising:
receiving a link quality indicator, the link quality indicator one of a plurality of link quality indicator values;
determining a conditional probability for each of the plurality of link quality indicator values, wherein the link quality indicator is a full link quality indicator, and wherein the link quality indicator is a measure of the Carrier to Interference ratio (C/I);
estimating the root mean square error of the mean square error as $$E\big((C/I) - (\hat{C/I}) \mid R\big)^2 \approx \sum_{i=}^{n} (Ci - E((C/I) \mid R)))^2 \, P(Ci \mid R),$$

wherein ($\hat{C/I}$) is an estimate of the link quality indicator; and
selecting one of the plurality of link quality indicators values based on the conditional probabilities, wherein selecting one of the plurality of link quality indicator values considers the minimum mean square error.

4. The method as in claim 3, further comprising:
scheduling link transmissions using the estimate of the minimum mean square estimate and the root mean square error.

5. A method in a wireless communication system, comprising:
receiving a link quality indicator, the link quality indicator one of a plurality of link quality indicator values;
determining a conditional probability for each of the plurality of link quality indicator values;
selecting one of the plurality of link quality indicator values based on the conditional probabilities;
estimating a future channel condition based on the conditional probabilities;
estimating a probability distribution of likely link quality indicator values,
wherein estimating the probability distribution further comprises:
calculating a standard deviation of $$(\hat{C/I}) = \sqrt{\frac{\pi}{2}} \cdot$$

estimate of average absolute difference; and
storing the estimate of the probability distribution in a memory storage device.

6. The method as in claim 5, further comprising:
estimating a minimum mean square error of the conditional probabilities, wherein selecting one of the plurality of link quality indicator values considers the minimum mean square error.

7. The method as in claim 6, wherein the link quality indicator is a full link quality indicator.

8. The method as in claim 7, wherein the link quality indicator is a measure of the Carrier to Interference ratio (C/I).

9. The method as in claim 5, wherein each of the plurality of link quality indicator values corresponds to a quantized link quality measurement.

10. The method as in claim 5, further comprising:
determining a first estimate of the received link quality indicator;
determining a second estimate of the received link quality indicator using previously received link quality indicators; and
determining a third estimate of the received link quality indicator as a function of the first and second estimates.

11. The method as in claim 10, comprising:
determining a weighting factor as a function of the first and second estimates; and
applying the weighting factor to determining the third estimate.

12. The method as in claim 10,
wherein the link quality indicators correspond to full link quality measurements.

13. A method in a wireless communication system, comprising:
receiving a link quality indicator, the link quality indicator one of a plurality of link quality indicator values;
determining a first estimate of the received link quality indicator;
determining a second estimate of the received link quality indicator using previously received link quality indicators; and
determining a third estimate of the received link quality indicator as a function of the first and second estimates;
determining a conditional probability for each of the plurality of link quality indicator values;
determining a weighting factor as a function of the first and second estimates; and applying the weighting factor to determining the third estimate, wherein determining the weighting factor comprises:
calculating $$\alpha = \frac{e_2}{e_1 + e_2},$$

wherein $e_1$ is a mean square error of the first estimate and $e_2$ is a mean square error of the second estimate; and selecting one of the plurality of link quality indicator values based on the conditional probabilities.

14. The method as in claim 13, wherein determining the third estimate comprises:
calculating $\hat{x}=\alpha\hat{x}_1+(1-\alpha)\hat{x}_2$, wherein $\hat{x}_1$ is the first estimate, and $\hat{x}_2$ is the second estimate.

15. The method as in claim 14, further comprising:
calculating a minimum mean square error of the third estimate as:

$$\min mse = \left(\frac{e_2}{e_1+e_2}\right)^2 e_1 + \left(\frac{e_1}{e_1+e_2}\right)^2 e_2.$$

16. The method as in claim 15, further comprising:
scheduling link transmissions based on the third estimate and the minimum mean square error.

17. The method as in claim 14, further comprising:
scheduling link transmissions based on the third estimate.

18. A wireless apparatus, comprising:
means for receiving a link quality indicator, wherein the link quality indicator is a full link quality indicator corresponding to a Carder to Interference ratio (C/I), the apparatus further comprising:
means for evaluating $$\sum_{i=1}^{n} Ci \frac{P(R|Ci)P(Ci)}{\sum_{j=1}^{n} P(R|Cj)P(Cj)},$$

wherein n is the total number of link quality values, $C_i$ represents each link quality indicator, R represents the received link quality indicator, P(l) is a conditional probability operator, and i and j are indices, the link quality indicator one of a plurality of link quality indicator values;
means for determining a conditional probability for each of the plurality of link quality indicator values;
means for selecting one of the plurality of link quality indicator values based on the conditional probabilities; and
means for estimating a minimum mean square error of the conditional probabilities,
wherein selecting one of the plurality of link quality indicator values considers the minimum mean square error.

19. The apparatus as in claim 18, further comprising:
means for estimating the root mean square error of the mean square error as $$E\big((C/I) - (C\hat{/}I)\,|\,R\big)^2 \approx \sum_{i=1}^{n} (C_i - E((C/I)|R)))^2 \; P(Ci|R),$$

wherein $(C\hat{/}I)$ is an estimate of the link quality indicator.

20. The method as in claim 18, further comprising:
means for scheduling link transmissions using the estimate of the minimum mean square estimate.

21. The apparatus as in claim 18, wherein each of the plurality of link quality indicator values corresponds to a quantized link quality measurement.

22. The apparatus as in claim 18, further comprising:
means for estimating a probability distribution of likely link quality indicator values; and
means for storing the estimate of the probability distribution in a memory storage device.

23. A method in a wireless communication system, comprising:
receiving a link quality indicator, the link quality indicator one of a plurality of link quality indicator values;
determining a conditional probability for each of the plurality of link quality indicator values; and
selecting one of the plurality of link quality indicator values based on the conditional probabilities; and
estimating a probability distribution of likely link quality indicator values wherein means for estimating the probability distribution further comprises:
means for calculating a standard deviation of $$(C\hat{/}I) = \sqrt{\frac{\pi}{2}} \cdot$$

estimate of average absolute difference; and
storing the estimate of the probability distribution in a memory storage device.

24. A wireless apparatus, comprising:
means for receiving a link quality indicator, the link quality indicator one of a plurality of link quality indicator values;
means for determining a first estimate of the received link quality indicator;
means for determining a second estimate of the received link quality indicator using a previously received link quality indicator; and
means for determining a third estimate of the received link quality indicator as a function of the first and second estimates;
means for determining a weighting factor as a function of the first and second estimates, wherein means for determining the weighting factor comprises:
means for calculating $$\alpha = \frac{e_2}{e_1 + e_2},$$

wherein $e_1$ is a mean square error of the first estimate and $e_2$ is a mean square error of the second estimate;
means for applying the weighting factor to determining the third estimate;
means for determining a conditional probability for each of the plurality of link quality indicator values; and means for selecting one of the plurality of link quality indicator values based on the conditional probabilities.

25. The apparatus as in claim 24, wherein means for determining the third estimate comprises:
means for calculating $\hat{x}=\alpha \hat{x}_1+(1-\alpha)\hat{x}_2$, wherein $\hat{x}_1$ is the first estimate, and $\hat{x}_2$ is the second estimate.

26. The apparatus as in claim 25, further comprising:
means for calculating a minimum mean square error of the third estimate as:

$$\min mse = \left(\frac{e_2}{e_1+e_2}\right)^2 e_1 + \left(\frac{e_1}{e_1+e_2}\right)^2 e_2.$$

27. The apparatus as in claim 26, further comprising:
means for scheduling link transmissions based on the third estimate and the minimum mean square error.

28. The apparatus as in claim 26, further comprising:
means for scheduling link transmissions based on the third estimate.

29. A method in a wireless communication system, comprising:
receiving a plurality of differential link quality indicators; and
for each of the plurality of differential link quality indicators estimating an originally transmitted differential indicator, wherein the originally transmitted differential indicator is one of two binary values, by:
determining a minimum mean square error for each of the two binary values,
wherein determining a mean square error comprises:
for each binary value, evaluating;

$$\hat{b} = \tanh\left(\frac{x\sqrt{E}}{N}\right).$$

and
estimating the originally transmitted as the binary value corresponding to the minimum mean square error.

30. An apparatus in a wireless communication system, comprising:
means for receiving a plurality of differential link quality indicators; and
means for estimating an originally transmitted differential indicator for each of the plurality of differential link quality indicators, wherein the originally transmitted differential indicator is one of two binary values, by:
determining a minimum mean square error for each of the two binary values, wherein determining a mean square error comprises:
for each binary value, evaluating;

$$\hat{b} = \tanh\left(\frac{x\sqrt{E}}{N}\right).$$

and
estimating the originally transmitted as the binary value corresponding to the minimum mean square error.

31. A wireless infrastructure element, comprising:
a processor for processing computer readable instructions; and
a memory storage device for storing computer readable instructions for:
receiving a link quality indicator, wherein the link quality indicator is a full link quality indicator corresponding to a measure of a Carrier to Interference ratio (C/I), and wherein the computer readable instructions are further for:
evaluating $$\sum_{i=1}^{n} Ci \frac{P(R|Ci)P(Ci)}{\sum_{j=1}^{n} P(R|Cj)P(Cj)},$$

wherein n is the total number of link quality values, $C_i$ represents each link quality indicator, R represents the received link quality indicator, P(|) is a conditional probability operator, and i and j are indices the link quality indicator one of a plurality of link quality indicator values;
determining a conditional probability for each of the plurality of link quality indicator values; and
selecting one of the plurality of link quality indicator values based on the conditional probabilities; and
wherein the computer readable instructions are further for:
estimating a minimum mean square error of the conditional probabilities,
wherein selecting one of the plurality of link quality indicator values considers the minimum mean square error.

32. The wireless infrastructure element as in claim 31, wherein the computer readable instructions are further for:
estimating the root mean square error of the mean square error as $$E\big((C/I)-(\hat{C/I})|R\big)^2 \approx \sum_{i=}^{n}(C_i-E((C/I)|R)))^2 P(Ci|R),$$

wherein $(\hat{C/I})$ is an estimate of the link quality indicator.

33. The wireless infrastructure element as in claim 32, wherein the computer readable instructions are further for:
scheduling link transmissions using the estimate of the minimum mean square estimate and the root mean square error.

34. The wireless infrastructure element as in claim 32, wherein the computer readable instructions are further for:
scheduling link transmissions using the estimate of the minimum mean square estimate.

35. The wireless infrastructure element as in claim 31, wherein the computer readable instructions are further for:
maintaining a mean and standard deviation corresponding to received link quality indicators.

36. A wireless infrastructure element, comprising:
a processor for processing computer readable instructions; and
a memory storage device for storing computer readable instructions for:
receiving a link quality indicator, the link quality indicator one of a plurality of link quality indicator values;

determining a conditional probability for each of the plurality of link quality indicator values; and selecting one of the plurality of link quality indicator values based on the conditional probabilities, wherein the computer readable instructions are further for:

determining a first estimate of the received link quality indicator;

calculating $$\alpha = \frac{e_2}{e_1 + e_2},$$

wherein $e_1$ is a mean square error of the first estimate and $e_2$ is a mean square error of the second estimate; and determining a second estimate of the received link quality indicator using a previously received link quality indicator;

determining a third estimate of the received link quality indicator as a function of the first and second estimates;

determining a weighting factor as a function of the first and second estimates; and applying the weighting factor to determining the third estimate.

37. The wireless infrastructure element as in claim 36, wherein the computer readable instructions are further for:

calculating $\hat{x} = \alpha \hat{x}_1 + (1-\alpha)\hat{x}_2$, wherein $\hat{x}_1$ is the first estimate, and $\hat{x}_2$ is the second estimate.

38. The wireless infrastructure element as in claim 37, wherein the computer readable instructions are further for:

calculating a minimum mean square error of the third estimate as:

$$\min mse = \left(\frac{e_2}{e_1+e_2}\right)^2 e_1 + \left(\frac{e_1}{e_1+e_2}\right)^2 e_2.$$

39. The wireless infrastructure element as in claim 38, wherein the computer readable instructions are further for:

scheduling link transmissions based on the third estimate and the minimum mean square error.

40. The wireless infrastructure element as in claim 38, wherein the computer readable instructions are further for:

scheduling link transmissions based on the third estimate.

* * * * *